Feb. 16, 1954 P. E. SCHLEICHER 2,669,393
HEATING SYSTEM
Filed Feb. 23, 1950 3 Sheets-Sheet 1
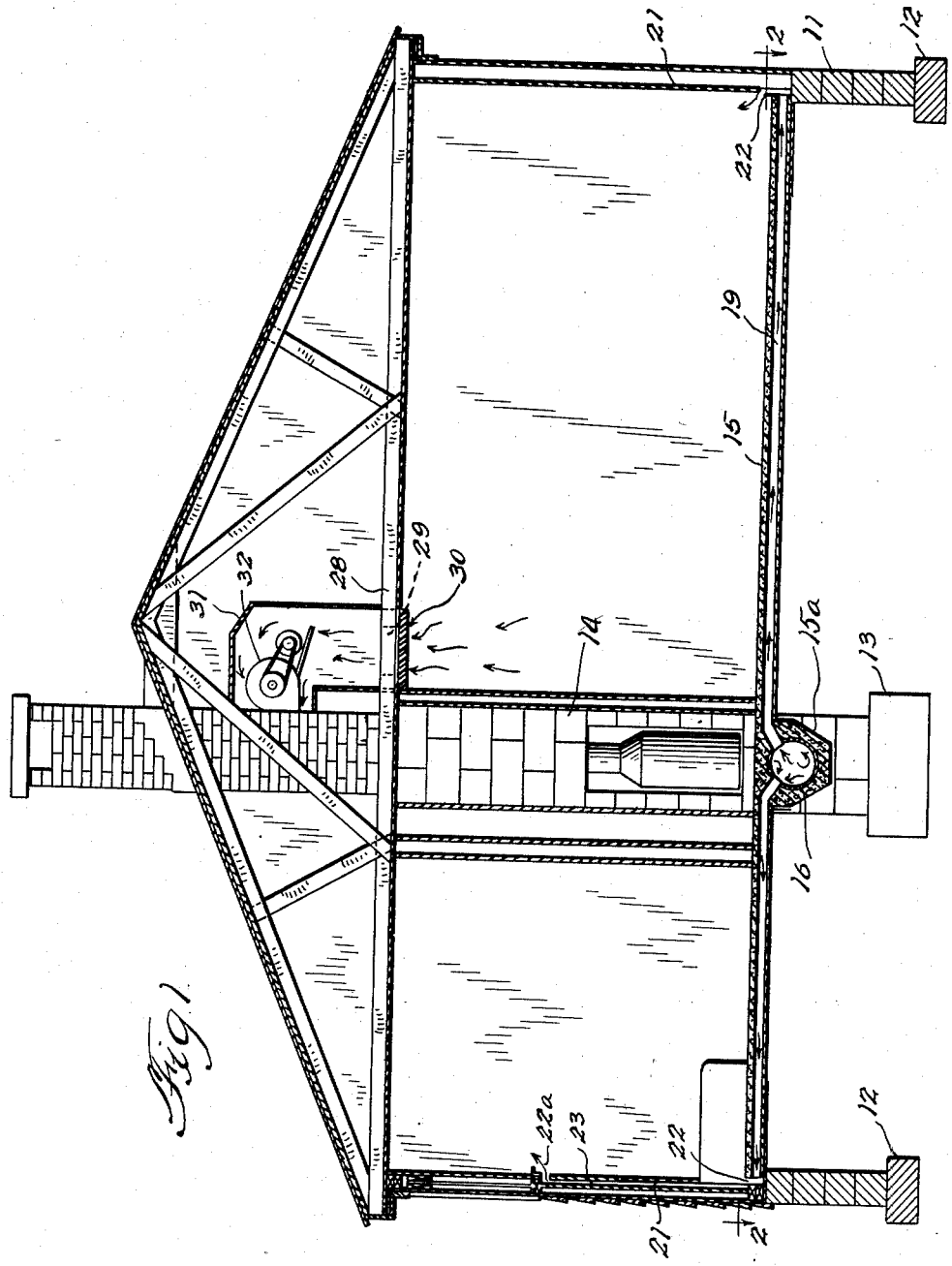
INVENTOR.
Paul E. Schleicher
BY

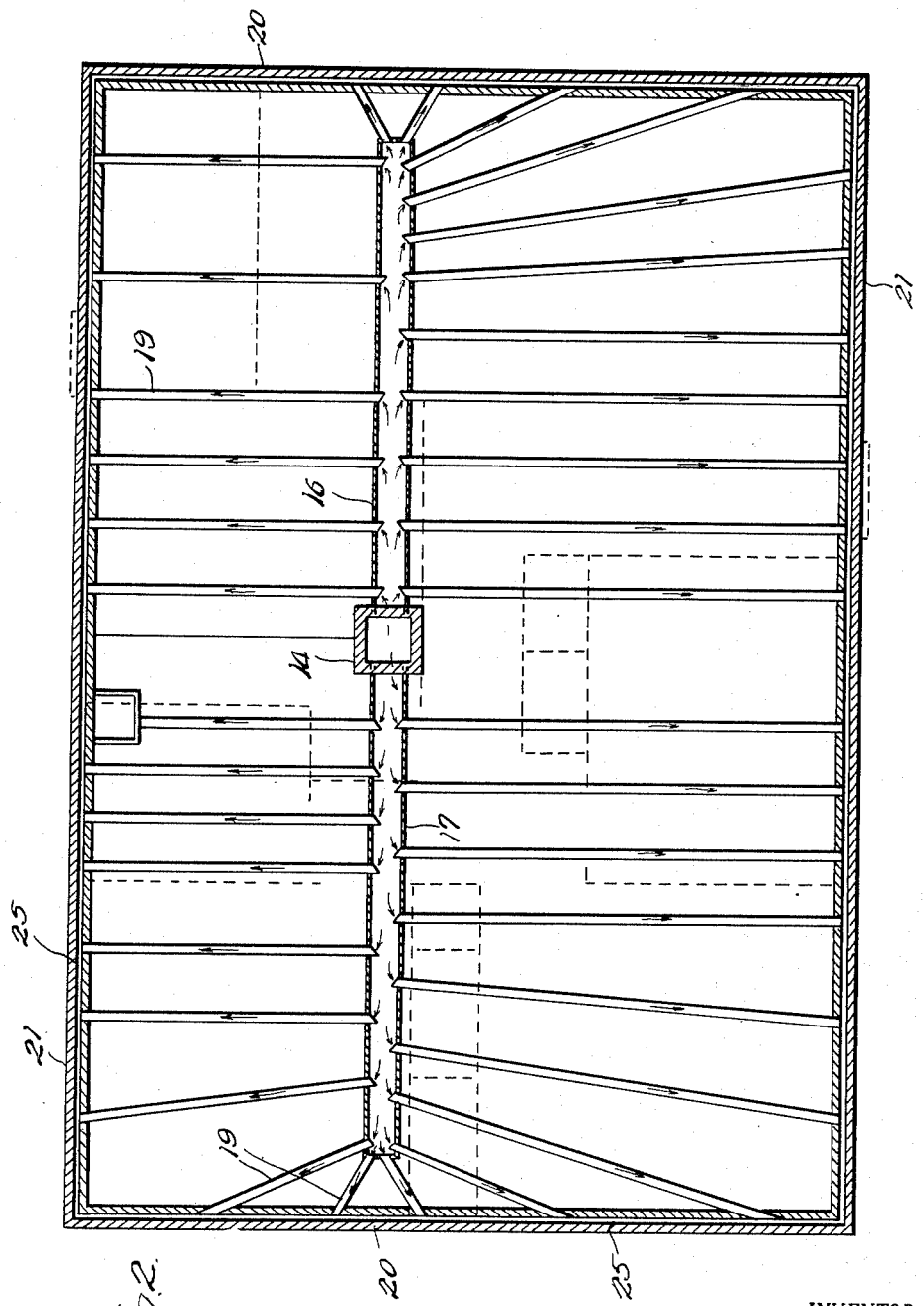

Feb. 16, 1954     P. E. SCHLEICHER     2,669,393
HEATING SYSTEM
Filed Feb. 23, 1950     3 Sheets-Sheet 3
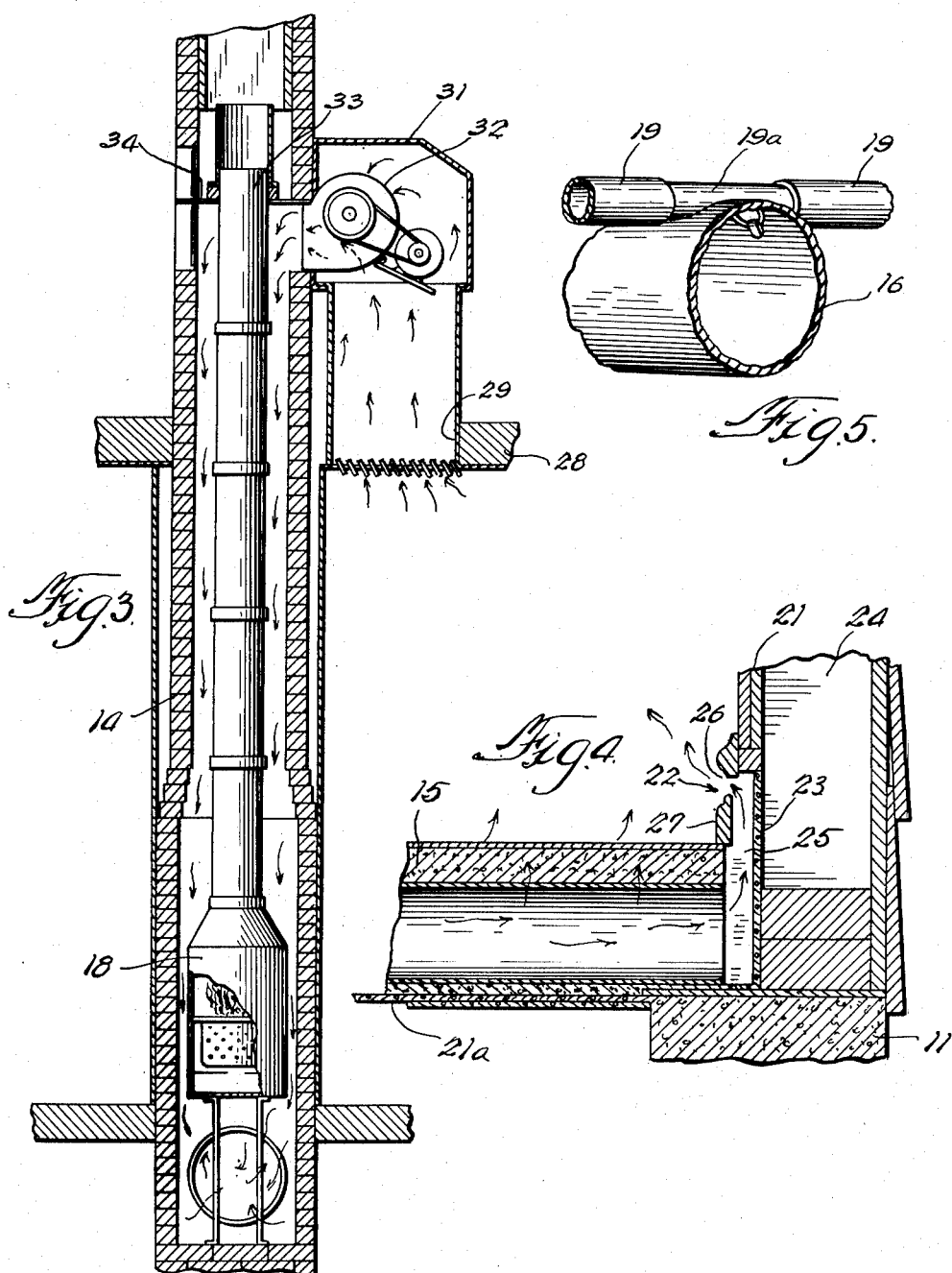
INVENTOR.
Paul E. Schleicher.
BY
Thiess, Olson & Mecklenburger
Attys.

Patented Feb. 16, 1954

2,669,393

UNITED STATES PATENT OFFICE 2,669,393

HEATING SYSTEM

Paul E. Schleicher, Gary, Ind., assignor of one-half to Saul Cohen, Gary, Ind.

Application February 23, 1950, Serial No. 145,614

8 Claims. (Cl. 237—69)

This invention relates to a heating system and has special reference to such a system for use in bungalow type buildings.

In order to facilitate the construction of dwellings and reduce their cost, many are being built without any basement and having only a single story. In such buildings it is common practice to have a floor comprising a relatively thick cast or poured portion, such, for example, as concrete, with a covering of asphalt tile, wood parquet, or any other suitable surfacing material thereover. Dwellings of this nature are included in the term "bungalow type," and systems embodying this invention are particularly adapted for use therein.

The heating system of the present invention is of the hot air type. The air is heated by any suitable type heater, preferably located at a distance from the outer walls. Extending from opposite sides of the heater and running longitudinally of the building is a large main trunk embedded in the floor, the latter being sufficiently thick adjacent the trunk to completely enclose it. Communicating with the main trunk and extending preferably normal thereto are a plurality of relatively small conduits which terminate at their outer ends adjacent the outer walls of the rooms in the bungalow. While these conduits are generally at right angles to the main trunk, they may fan out at an angle thereto at the ends of the building.

Continuous horizontal outlets are provided in the outer walls of each of the rooms generally adjacent the floor or baseboard, and the conduits discharge into these outlets. Therefore, the heated air flows into each of the rooms in a continuous sheet along the outer walls.

With such a construction, the heated air flowing through the conduits embedded in the floor will heat the floor, which then radiates heat into the various rooms. At the same time, the air discharged from the conduits through the continuous warm air outlets will further heat the rooms by convection. The conduits embedded in the floor are so arranged and spaced that while the floor is heated sufficiently to radiate heat, the temperature thereof will not, in normal operation, become high enough to be uncomfortable to the occupants of the rooms. Accordingly, the temperature of the floor is prevented from rising substantially above the mean temperature maintained in the room.

The heated air is forced through the conduits with sufficient velocity to keep the air in the room moving and prevent stratification and wide variation in temperature from floor to ceiling. Moreover, the heat from the floor also rises and further tends to maintain an unusually uniform temperature in the room.

A centrally arranged discharge opening is formed in a side wall adjacent the ceiling or in the ceiling itself, through which air from the building may return to the furnace or other suitable heating means. A blower may be positioned at the outlet side of this discharge to draw the air from the building through the discharge opening and force it down the chimney flue to the heating means and from there through the main trunk and the branch conduits back into the room.

An object of the present construction is to provide a heating system which may be employed in a bungalow type dwelling for heating the same, both by radiation and convection.

A further object is to provide a heating construction in which hot air from the heating means is supplied to main trunks from which it is carried to continuous horizontal outlets in the various rooms by means of spaced conduits embedded in the floor.

Another object is to provide such a heating construction in which the temperature of the upper surface of the floor is prevented from becoming substantially higher than the mean temperature inside the various rooms.

Still another object is to provide a heating construction of the above type in which a wide temperature differential between floor and ceiling is prevented and the temperature throughout the dwelling is maintained relatively uniform.

Further objects and advantages will be apparent from the following description and claims when considered together with the drawings, in which:

Fig. 1 is a cross-sectional view of a bungalow type building with a heating system embodying the present invention installed therein;

Fig. 2 is a horizontal cross-sectional view taken along the lines 2—2 of Fig. 1;

Fig. 3 is a vertical cross-sectional view partially in elevation taken through the chimney;

Fig. 4 is an enlarged cross-sectional view of the intersection of the floor and outer wall shown in Fig. 1; and Fig. 5 is a perspective view of a modified form of connection between the trunk and the conduits.

Referring more particularly to the drawings, there is shown a bungalow type building having installed therein a heating system embodying the present invention. The building may be rectangular in outline and have a number of rooms arranged in a single story with no basement. It may be supported on a foundation wall 11 of any suitable construction mounted on sunken footings 12. A footing 13 is also positioned beneath a central portion of the building for supporting thereabove the chimney 14 and a furnace or other suitable heating means.

The floor of the building preferably comprises a relatively thick cast structure 15 formed, for example, of concrete or other material which flows or is plastic, and subsequently sets or hardens. A longitudinal floor strip 15a, at opposite sides of the heater, is made relatively deep to receive therein trunks 16 and 17.

Positioned in the lower part of the chimney 14 is a furnace or heater 18 of any suitable type for heating air, this being the medium employed for heating the various rooms of the building. The furnace is provided with the usual heat-transfer areas over which the air to be heated is passed. The trunks 16 and 17 extend longitudinally of the building from opposite sides of the heater 18. They are embedded in the thick floor section 15a with their upper surfaces somewhat below the level of the cast floor portion.

A number of spaced conduits 19, having a cross-sectional area substantially less than that of the trunks, extend from said trunks to adjacent the outer walls 21 of the building. They preferably run transversely of the building, except at the ends thereof where they fan out and extend to the end walls 20 instead of the side walls 21. The inner ends of the conduits 19 may be substantially scoop shaped as shown in Fig. 2. When the conduits are oppositely disposed they may be connected to a cross pipe 19a communicating with the top of the trunk and shaped to conform to the inner contour thereof. As air moves through the trunks from the heater it will enter the inner ends of the conduits.

The conduits 19, which may be formed from any suitable material, such as tubes of cardboard lined with aluminum foil, are embedded in the cast floor. This may be accomplished by properly positioning the trunks 16 and 17 and the connecting conduits 19. Thereafter the main floor portion 15 is poured so as to completely surround the trunks and tubes, as illustrated most clearly in Fig. 4. Suitable insulation material 21a is preferably placed beneath the cast flooring to minimize any heat loss, or to prevent the entry of any moisture, therethrough.

In a building the outer dimensions of which are approximately 24 by 36 feet, it has been found suitable to employ trunks having an inner diameter of about 12½ inches and conduits having a diameter of approximately three inches. With conduits of this size, the cast portion of the floor is preferably about 4½ inches thick. This is sufficient to completely embed the conduits therein and provide a substantial thickness of material over the conduits. Positioned on the upper surface of the cast floor portion 15 there is a suitable floor surfacing or finishing material, such as asphalt tile or wood parquet.

The conduits 19 arranged as above described may be spaced about two feet apart on centers, although if it is desired to maintain the room thereover warmer or cooler than the normal house temperature, the tubes may be placed either closer together or farther apart. For example, it is frequently desirable to maintain the bathroom at a higher temperature than the remainder of the dwelling. In such circumstances the conduits may be positioned about a foot and a half apart on centers.

Adjacent the outer walls of the various rooms there are horizontal, substantially-continuous, hot-air outlets 22, shown most clearly in Fig. 4. They may be formed by a backing 23, preferably of insulating material with a reflective coating on the inner side thereof, and are spaced outwardly of the conduits 19 and cast floor 15 on the inner side of the walls 24. The space 25 between the backing 23 and the cast floor 15 extends upwardly above the top surface of the floor and communicates with each of the rooms through the openings 26. These hot air outlets 22 extend substantially the entire length of the outer wall or walls in each of the rooms so that air will pass therethrough in a continuous sheet. The openings 26 may be formed in or above the molding 27. If desired, such as in a bathroom with the tub placed adjacent the outer wall, the outlet may be a substantial distance above the floor, as indicated at 22a.

Formed in a central portion of the ceiling 28 or adjacent the ceiling in a centrally located side wall of the building there is a discharge opening 29 having positioned therein an adjustable shutter or grill 30. The discharge opening 29 communicates with the interior of the chimney by means of a large passageway or pipe 31 in which a blower or fan 32 is positioned. The fan is arranged to draw air through the opening 29 and force it into the chimney 14.

Referring to Fig. 3, it is to be noted that there is a flue 33 for the heater 18 positioned centrally in the chimney. A partition 34 located above the point of connection of the passageway 31 with the chimney 14 closes off therebelow the space in the chimney surrounding the flue 33. Accordingly, when the fan operates, the air from the room is pulled up through the passageway 31 and then forced downwardly into the chimney about the flue 33. This space about the flue directs the air past the heat exchange surface of the heater 18 and forces it into the trunks 16 and 17 from which it flows into the rooms through the conduits 19 and the hot air outlets 22.

As the hot air is forced from the heater through the conduits 19 the floor about the conduits is warmed and radiates heat into the rooms thereover. At the same time, the hot air passes into the rooms through the hot air outlets 22, thereby further heating the rooms.

The sizes and arrangement of the tubes are such as to prevent the floor being heated to such an extent as to be uncomfortable. The construction hereinabove disclosed has been found quite satisfactory. Even when the warm air is being forced through the tubes, the floor is only gradually heated to a temperature not substantially above that desired or predetermined for the mean temperature of the room, the mean temperature herein being construed to mean that approximately midway between the floor and the ceiling at the height a thermostat is commonly mounted. The normal desired or predetermined mean temperature is generally 70–72° F. The temperature of the surface of the floor or the space adjacent thereto should not be more than about 2° above the desired mean temperature.

The present system results in high efficiency and great comfort to the occupants of the building. The movement of the air from the outlets into the various rooms and from the rooms to the discharge opening 29 in the ceiling 28 prevents stratification of the air and avoids a condition wherein the temperature of the air adjacent the ceiling is much higher than that adjacent the floor. Moreover, the radiation of heat from the floor also tends to maintain the variation in temperature within the rooms at a minimum. The floor is gradually heated as hot air is forced through the conduits and even after the flow is discontinued, the floor, being warm, slowly continues to radiate heat.

Only one discharge outlet 29 is required although the present system is not limited thereto. With a single discharge opening 29, it is preferably positioned in a rather centrally located hall or room which directly communicates with the various other rooms in the house.

The heating system is preferably controlled thermostatically in a conventional manner. In one arrangement, when the room temperature drops below the temperature for which the thermostat is set, the furnace is turned on. However, the fan operates only when the heat-transfer area or surface of the furnace has reached a predetermined temperature, and continues only so long as this area is within a predetermined temperature range. For example, the fan limit switch may be set at 125–110° F. This will result in a temperature of the air at the hot air outlets of approximately 100° F., which has been found suitable. In a dwelling of the size above mentioned, namely, approximately 24 by 36 feet, a fan or blower having a capacity of 800 cubic feet per minute is satisfactory.

While I have shown a particular embodiment of my invention, it will be understood, of course, that I do not wish to be limited thereto since many modifications may be made, and I, therefore, contemplate by the appended claims to cover any such modifications as wall within the true spirit and scope of my invention.

Having thus described my invention, what I claim and desire to secure by Letters Patent is:

1. A heating system for a bungalow type building having a plurality of rooms and a floor comprising a relatively thick cast structure, said heating system comprising means for heating air, a relatively large substantially horizontal trunk for conveying heated air extending from said means toward opposed walls of said building, a plurality of relatively small spaced conduits embedded in said cast structure transversely of and overlying said trunk, said trunk having openings in the upper side thereof and said conduits having openings in their lower side communicating with the openings in said trunk, continuous substantially horizontal outlets along the outer walls of said rooms extending substantially the full length of said walls, said outlets receiving air from said conduits and discharging it into said rooms, and means for forcing air from said heating means through said conduits to said rooms.

2. A heating system for a bungalow type building having a plurality of rooms and a floor comprising a relatively thick cast structure, said heating system comprising means for heating air, a relatively large substantially horizontal trunk for conveying heated air extending from said means toward opposed walls of said building, a plurality of relatively small spaced conduits embedded in said cast structure transversely of and overlying said trunk, said trunk having openings in the upper side thereof and said conduits being cut away on their lower sides to fit the upper side of said trunk and communicate with the openings therein, continuous substantially horizontal outlets along the outer walls of said rooms extending substantially the full length of said walls, said outlets receiving air from said conduits and discharging it into said rooms, and means for forcing air from said heating means through said conduits to said rooms.

3. A heating system for a bungalow type of building having a plurality of rooms and a floor comprising a relatively thick cast structure, said heating system comprising means for heating air, a relatively large horizontal trunk for conveying heated air extending from said means generally longitudinally of one dimension of said building, a plurality of conduits having a cross-sectional area not substantially greater than that of a circular conduit of about three inches in diameter, said conduits in general being substantially normal to said trunk and spaced apart a distance to substantially heat said cast floor throughout its area to a temperature not substantially exceeding the mean temperature of said rooms, continuous substantially horizontal outlets along the outer walls of said rooms extending substantially the full length of said walls, said outlets receiving air from said conduits and discharging it into said room, and means for forcing air from said heating means through said conduits to said rooms.

4. A heating system for a bungalow type of building having a plurality of rooms and a floor comprising a relatively thick cast structure, said heating system comprising means for heating air, a relatively large horizontal trunk for conveying heated air extending from said means generally longitudinally of one dimension of said building, a plurality of conduits having a cross-sectional area not substantially greater than that of a circular conduit of about three inches in diameter, said conduits in general being substantially normal to said trunk and being spaced in general not substantially less than eighteen inches and not substantially more than about two feet apart, the size of said conduits and the distance apart being such as to substantially heat said cast floor throughout its area to a temperature not substantially exceeding the mean temperature of said rooms, continuous substantially horizontal outlets along the outer walls of said rooms extending substantially the full length of said walls, said outlets receiving air from said conduits and discharging it into said room, and means for forcing air from said heating means through said conduits to said rooms.

5. A heating system for a bungalow type of building having a plurality of rooms and a floor comprising a cast structure of substantial thickness, said heating system comprising means for heating air, a large horizontal trunk communicating with said heating means for conveying heated air received therefrom, said trunk extending generally longitudinally of one dimension of said building and for most of the distance between the outer walls thereof, a plurality of relatively small spaced conduits in said cast structure generally transversely of said trunk, said trunk lying generally below said conduits and having small openings in the upper portions thereof, said conduits having their inner ends communicating with said openings, continuous substantially horizontal outlets along the outer walls of said rooms generally adjacent the floors extending substantially the full length of said walls, said outlets receiving heated air from said conduits and discharging it into said rooms, and means for forcing air from said heating means through said conduits to said rooms.

6. A heating system for a bungalow type of building having a plurality of rooms and a floor comprising a cast structure of substantial thickness, said heating system comprising means for heating air, a large horizontal trunk communicating with said heating means for conveying heated air received therefrom, said trunk extending generally longitudinally of one dimension of said building and for most of the distance between the outer walls thereof, a plurality of relatively small spaced conduits in said cast structure generally transversely of said trunk, said trunk lying generally below said conduits and having small openings in the upper portions thereof, said conduits being generally spaced not substantially less than 18 inches apart and having their inner ends communicating with said openings, continuous substantially horizontal outlets along the outer walls of said rooms generally adjacent the floors extending substantially the full length of said walls, said outlets receiving heated air from said conduits and discharging it into said rooms, and means for forcing air from said heating means through said conduits to said rooms.

7. A heating system for a bungalow type of building having a plurality of rooms and a floor comprising a cast structure of substantial thickness, said heating system comprising means for heating air, a large horizontal trunk communicating with said heating means for conveying heated air received therefrom, said trunk extending generally longitudinally of one dimension of said building and for most of the distance between the outer walls thereof, a plurality of relatively small spaced conduits in said cast structure generally transversely of said trunk, said trunk lying generally below said conduits and having small openings in the upper portions thereof, said conduits underlying not substantially more than 20% of said floor surface and communicating with the said openings, continuous substantially hoirzontal outlets along the outer walls of said rooms generally adjacent the floors extending substantially the full length of said walls, said outlets receiving heated air from said conduits and discharging it into said rooms, and means for forcing air from said heating means through said conduits to said rooms.

8. A heating system for a bungalow type of building having a plurality of rooms and a floor comprising a cast structure of substantial thickness, said heating system comprising means for heating air, a large horizontal trunk communicating with said heating means for conveying heated air received therefrom, said trunk extending generally longitudinally of one dimension of said building and for most of the distance between the outer walls thereof, a plurality of relatively small spaced conduits in said cast structure generally transversely of said trunk, said trunk lying generally below said conduits and having small openings in the upper portions thereof, said conduits being spaced apart a distance to substantially heat said cast floor throughout its area to a temperature not substantially exceeding the mean temperature of said rooms and having their inner ends communicating with said openings, continuous substantially horizontal outlets along the outer walls of said rooms generally adjacent to the floors extending substantially the full length of said walls, said outlets receiving heated air from said conduits and discharging it into said rooms, and means for forcing air from said heating means through said conduits to said rooms.

PAUL E. SCHLEICHER.

References Cited in the file of this patent

UNITED STATES PATENTS

| Number | Name | Date |
|---|---|---|
| 251,309 | Spaulding | Dec. 20, 1881 |
| 899,078 | Salmon | Sept. 22, 1908 |
| 2,127,095 | Strong | Aug. 16, 1938 |
| 2,195,691 | Burt | Apr. 2, 1940 |
| 2,206,119 | Pearsons | July 2, 1940 |
| 2,210,960 | Pierre | Aug. 13, 1940 |
| 2,237,831 | Jones | Apr. 8, 1941 |
| 2,417,463 | Anderson | Mar. 18, 1947 |
| 2,465,184 | Alderman | Mar. 22, 1949 |
| 2,480,596 | Mueller | Aug. 30, 1949 |

FOREIGN PATENTS

| Number | Country | Date |
|---|---|---|
| 2,009 | Great Britain | July 27, 1914 |
| 705,062 | Germany | Apr. 16, 1941 |